United States Patent
Wang et al.

(10) Patent No.: US 6,520,320 B1
(45) Date of Patent: Feb. 18, 2003

(54) LINEAR STAGE WITH SEAL BAND

(76) Inventors: Fu-Ching Wang, No. 46, 37th Road, Taichung Industrial Park, Taichung City (TW); Chen-Shaung Tsai, No. 46, 37th Road, Taichung Industrial Park, Taichung City (TW); Arthur Liu, No. 46, 37th Road, Taichung Industrial Park, Taichung City (TW)

( * ) Notice: Subject to any disclaimer, the term of this patent is extended or adjusted under 35 U.S.C. 154(b) by 0 days.

(21) Appl. No.: 10/061,678

(22) Filed: Feb. 4, 2002

(51) Int. Cl.[7] ................................................ B65G 25/00
(52) U.S. Cl. ................................. 198/750.7; 198/750.1
(58) Field of Search ...................... 198/750.7, 750.1, 198/750.3, 468.9; 414/749.1

(56) References Cited

U.S. PATENT DOCUMENTS

| | | | | |
|---|---|---|---|---|
| 5,054,608 A | * | 10/1991 | Bryant | 198/816 |
| 5,074,160 A | * | 12/1991 | Kasuga | 74/89.15 |
| 5,211,279 A | * | 5/1993 | Abbestam et al. | 198/750 |
| 5,267,641 A | * | 12/1993 | Hallstrom, Jr. | 198/750 |
| 5,320,214 A | * | 6/1994 | Kordis | 198/750 |
| 5,397,212 A | * | 3/1995 | Watanabe et al. | 414/744.6 |
| 5,915,916 A | * | 6/1999 | Saji | 414/749 |
| 6,308,821 B1 | * | 10/2001 | Asai et al. | 798/750.7 |

* cited by examiner

Primary Examiner—Douglas Hess
(74) Attorney, Agent, or Firm—Charles E. Baxley

(57) ABSTRACT

The present invention relates to a linear stage with a seal band, including a dustproof belt, wherein the dustproof belt is made of high-molecular material, so that the loss value of the power of the movement seat of the linear stage may be reduced. In addition, the roller set is designed as the guide device, so that the contact resistance may be reduced, thereby increasing the working efficiency and the exactness of the linear stage.

4 Claims, 2 Drawing Sheets

LINEAR STAGE WITH SEAL BAND

BACKGROUND OF THE INVENTION

1. Field of the Invention

The present invention relates to a linear stage with a seal band, and more particularly to a linear stage with a seal band, wherein the dustproof belt is made of high-molecular material, and the roller set is designed as the guide device.

2. Description of the Related Art

A conventional linear stage with a seal band in accordance with the prior art comprises a base, a guide-way, a movement seat, a transmission mechanism, and a seal band. The linear stage may use the power produced by the power source to drive the movement seat placed on the guide-way of the base by the transmission mechanism, so that the movement seat may be moved on the guide-way of the base reciprocally in a linear manner. The linear stage is usually applied in a working environment that has a greater requirement for protection of dust, so that the dustproof equipment is very important.

A conventional dustproof equipment of the linear stage includes a dustproof plate, such as disclosed in U.S. Pat. No. 5,074,160 and U.S. Pat. No. 5,211,279. The upper portion of the linear stage id provided with a metallic dustproof plate for covering the linear stage, thereby preventing the impurities such as dust or cutting chips from entering the linear stage, to block the transmission action and to break the parts. In the above-mentioned conventional linear stage, the metallic dustproof plate does not affect the movement seat under movement at a lower speed, so that the linear stage may be operated normally. When the velocity is increased, the metallic dustproof plate has a smaller flexibility, so that it is necessary to apply a considerable force to change the bent condition of the metallic dustproof plate rapidly, so as to change the flat metallic dustproof plate into an arc-shape rapidly, and to restore the arc-shaped metallic dustproof plate into a linear shape rapidly. The force will consume the power of the movement seat, and the extent of consumption is more when the velocity is higher, so that the metallic dustproof plate is not available for a working environment with movement at a high speed.

Next, the contact friction effect of the conventional dustproof equipment of the linear stage has to be considered. In general, under the normal and the same condition, the resistance of the sliding friction is greater than that of the roll friction. In the above-mentioned conventional linear stage, the friction between the metallic dustproof plate and the movement seat is a sliding friction (surface contact), so that the friction resistance is greater. In addition, the sliding friction will produce more chips due to friction, thereby causing the environmental pollution. In conclusion, the linear stage is usually applied in the precise machinery or in the site that needs a higher precision, so that the requirement for working efficiency and exactness is higher. The surface contact of the conventional metallic dustproof plate of the linear stage will decrease the working efficiency and the exactness, and will produce more chips due to friction.

SUMMARY OF THE INVENTION

The present invention has arisen to mitigate and/or obviate the disadvantage of the conventional metallic dustproof plate of the linear stage.

The primary objective of the present invention is to provide a linear stage with a seal band, for preventing the dust from consuming the power of the movement seat of the linear stage when the movement seat of the linear stage is moved at a high speed.

Another objective of the present invention is to provide a linear stage with a seal band, wherein the contact resistance may be reduced, thereby increasing the working efficiency and the exactness of the linear stage, and thereby reducing production of the friction chips.

The present invention relates to a linear stage with a seal band, wherein the linear stage includes a substantially closed housing which is provided with an elongated channel. A dustproof belt is mounted under the opening of the channel, and has a width slightly greater than that of the opening of the channel, thereby preventing from entrance of dust or cutting chips. The dustproof belt is made of high-molecular material, thereby increasing the flexibility of the dustproof belt. Thus, when the movement seat of the linear stage is moved at a high speed, the loss value of the dustproof belt to the power of the movement seat of the linear stage may be reduced.

Before the dustproof belt in the housing enters the movement seat of the linear stage, the dustproof belt has to pass through a guide device which may guide the dustproof belt to properly enter the movement seat of the linear stage, so that the dustproof belt and the movement seat of the linear stage will not produce a sliding friction.

The guide device may be designed as a roller set consisting of rollers, thereby changing the direction of movement of the dustproof belt by the rollers, for reducing the friction resistance of the dustproof belt and the chips of friction.

When the movement seat of the linear stage is moved, the dustproof belt only contacts the rollers, while the contact friction of the movement seat of the linear stage is a roll friction between the rollers and the dustproof belt, and the friction coefficient of the roll friction is smaller than that of the sliding friction, so that the contact resistance may be reduced, thereby increasing the working efficiency and the exactness of the linear stage.

In accordance with the present invention, there is provided a linear stage with a seal band, comprising:

a housing, including a channel extended along an axial direction;

a guide-way, mounted in the housing along an axial direction;

a movement seat, fixed on a slider of the guide-way, to axially move along the guide-way, the movement seat including a driven member locking portion protruded outward from the channel of the housing, for mounting a driven member;

a dustproof belt, passing through an underside of the movement seat, the dustproof belt located under and near an opening of the channel except the part passing through the movement seat, the dustproof belt having two ends fixed on two side ends of the housing, so that when the movement seat is moved, the two ends of the dustproof belt is fixed and is not moved with the movement seat, and the dustproof belt may cover the opening of the channel, thereby producing a dustproof effect;

a drive member, for driving the movement seat to axially move along the guide-way; and a roller set, for guiding the dustproof belt to pass through the movement seat.

Further benefits and advantages of the present invention will become apparent after a careful reading of the detailed description with appropriate reference to the accompanying drawings.

DETAILED DESCRIPTION OF THE INVENTION

Figure 1:
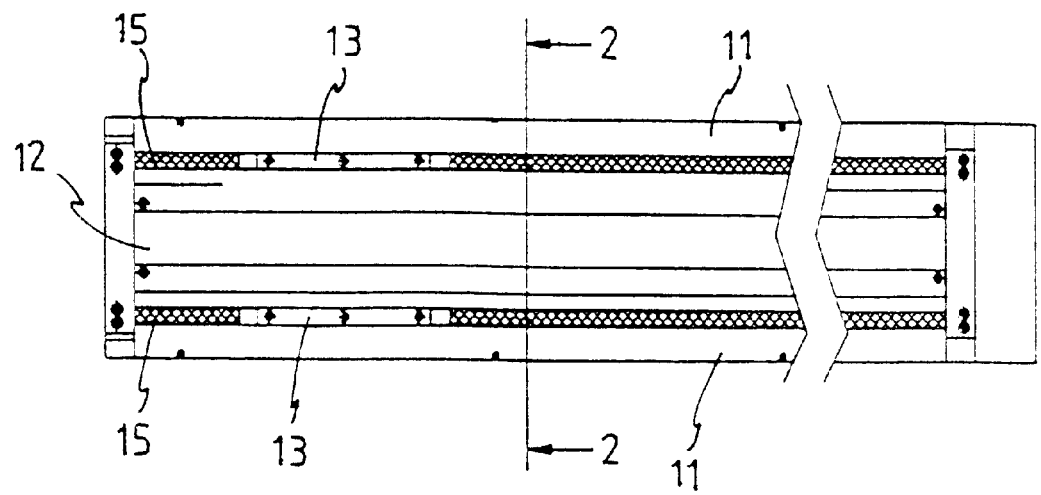
FIG. 1 is a top plan cross-sectional view of a linear stage with a seal band in accordance with a first embodiment of the present invention.
Figure 2:
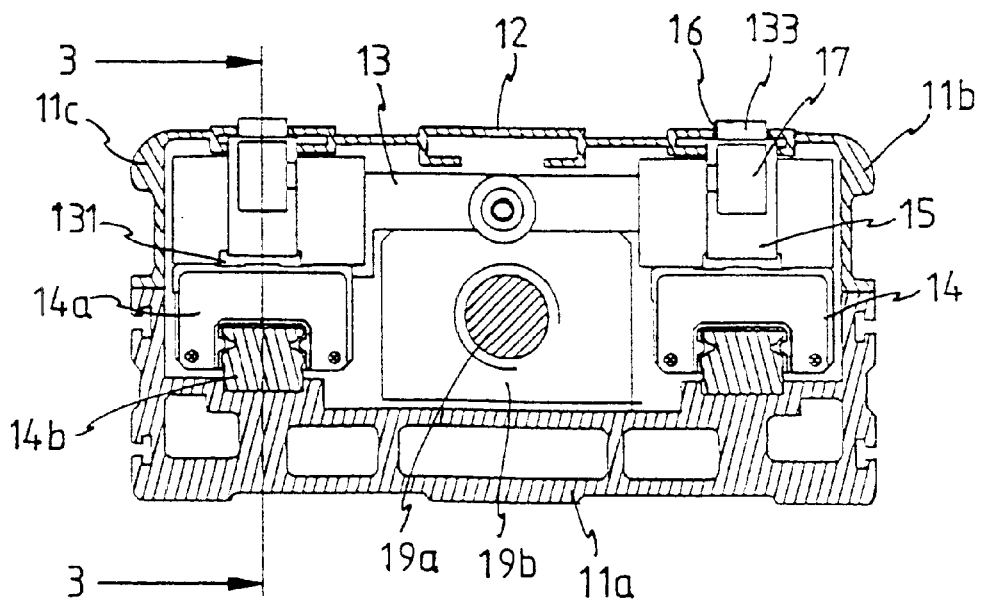
FIG. 2 is a cross-sectional view of the linear stage with a seal band taken along line 2—2 as shown in FIG. 1.
Figure 3:
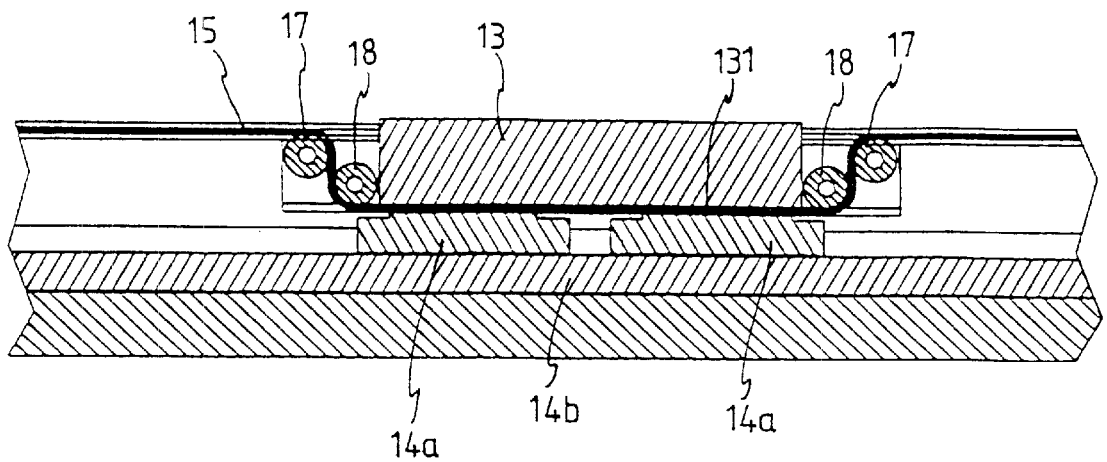
FIG. 3 is a cross-sectional view of the linear stage with a seal band taken along line 3—3 as shown in FIG. 2.

Referring to the drawings and initially to FIGS. 1–3, FIG. 1 is a top plan cross-sectional view of a linear stage with a seal band in accordance with a first embodiment of the present invention, FIG. 2 is a cross-sectional view of the linear stage with a seal band taken along line 2—2 as shown in FIG. 1, and FIG. 3 is a cross-sectional view of the linear stage with a seal band taken along line 3—3 as shown in FIG. 2.

The linear stage with a seal band in accordance with a first embodiment of the present invention comprises a housing 11, an upper cover plate 12, a movement seat 13, a linear slide-way 14, and a dustproof belt 15.

The housing 11 consists of a base 11a, a right side plate 11b and a left side plate 11c. The linear stage has a strip-shape, and consists of the housing 11 and the upper cover plate 12. Two elongated channels 16 are formed between the housing 11 and the upper cover plate 12, and are extended along the axial direction of the entire linear stage. Each channel 16 is provided with a dustproof belt 15 near the opening thereof. The dustproof belt 15 is made of high-molecular material, and has a width slightly greater than that of the opening of each channel 16. The dustproof belt 15 has two ends fixed on the two side end caps of the housing 11, so that the two dustproof belts 15 cover the opening of the two channels 16 respectively, and so that the inner working environment and the outer working environment of the housing 11 of the linear stage 10 do not contact with each other directly, thereby producing a protection function.

In addition, the movement seat 13 of the linear stage, is locked on the slider 14a of the linear slide-way 14 in the housing 11, and is locked with a nut 19b which may mate with a ball screw 19a to output the power to drive the movement seat 13 of the linear stage, to move. The movement seat 13 of the linear stage has a driven member locking portion 133 protruded outward from the channel 16 of the housing 11, for locking a driven member.

Further, the movement seat 13 of the linear stage has two dustproof belt grooves 131, so that when the movement seat 13 of the linear stage is driven by the ball screw 19a and the nut 19b to axially move along the rail 14b under the slider 14a of the linear slide-way 14, the two dustproof belts 15 may pass through two dustproof belt grooves 131 respectively, so that movement of the movement seat 13 of the linear stage will not be hindered.

Further, the dustproof belt 15 is made of high-molecular material, and has a flexibility greater than that of the metal, so that when the movement seat 13 of the linear stage is moved at a high speed, the loss value of the dustproof belt 15 to the power of the movement seat 13 of the linear stage may be reduced.

As shown in FIGS. 2 and 3, before the dustproof belt 15 in the housing 11 enters the movement seat 13 of the linear stage the dustproof belt 15 has to pass through a roller set consisting of rollers 17 and rollers 18, thereby producing a position difference to guide the dustproof belt 15 to enter and leave the dustproof belt groove 131, thereby passing through the movement seat 13 of the linear stage, so that the movement seat 13 of the linear stage is not hindered during movement.

According to the present invention, the dustproof belt 15 may produce a position difference by using the roller set, thereby facilitating the dustproof belt 15 being introduced into and out of the dustproof belt groove 131 of the movement seat 13 of the linear stage The contact friction of movement of the movement seat 13 of the linear stage is a roll friction between the roller set and the dustproof belt 15, and the friction coefficient of the roll friction is smaller than that of the sliding friction, so that the contact resistance may be reduced, thereby increasing the working efficiency and the exactness of the linear stage.

Figure 4:
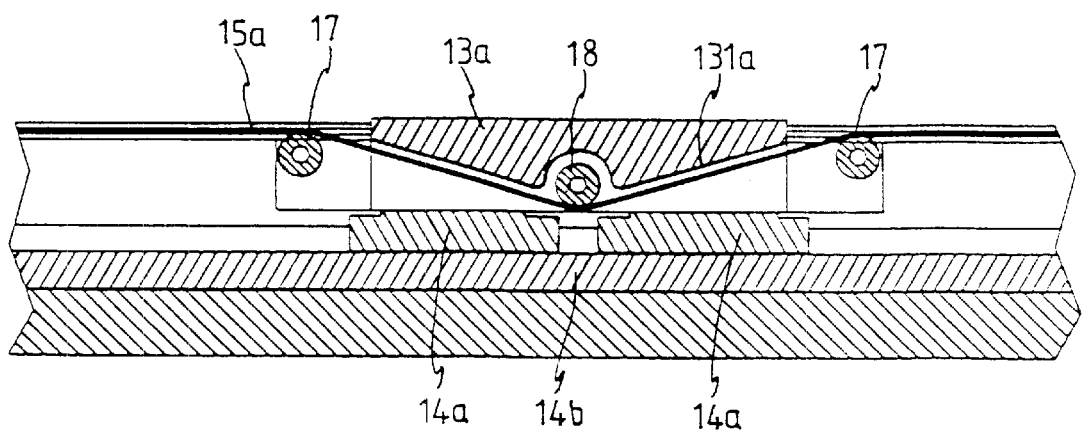
FIG. 4 is a cross-sectional view of the linear stage with a seal band taken along line 3—3 as shown in FIG. 2, in accordance with a second embodiment of the present invention.

FIG. 4 is a cross-sectional view of the linear stage with a seal band taken along line 3—3 as shown in FIG. 2, in accordance with a second embodiment of the present invention. In the second embodiment of the present invention, the movement seat 13a above the dustproof belt groove 131a has a substantially V-shaped structure. The roller 18 is located under the center of the movement seat 13a, that is, the V-shaped top point of the dustproof belt o groove 131a. The dustproof belt 15a passes through the upper portion of the roller 17 and the lower portion of the roller 18, so that when the dustproof belt 15a passes through the movement seat 13a, the dustproof belt 15a may present a V-shaped state, so as to mate with the V-shaped structure of the dustproof belt groove 131a.

Thus, in the second embodiment of the present invention, each roller set may reduce a roller 18, thereby decreasing cost of production and fabrication. In addition, the curvature of the dustproof belt 15a may be reduced, thereby apparently helping the quick movement of the movement seat 13a.

The linear stage with a seal band in accordance with the present invention may use a dustproof belt made of high-molecular material. The dustproof belt has a flexibility greater than that of the metal, so that the loss value of the power of the movement seat of the linear stage may be reduced. In addition, the roller set is designed as the guide device, whereby the roll friction may replace the sliding friction, so that the contact resistance may be reduced, thereby increasing the working efficiency and the exactness of the linear stage.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A linear stage with a seal band, comprising:

a housing, including a channel extended along an axial direction;

a guide-way, mounted in the housing along an axial direction;

a movement seat, fixed on a slider of the guide-way, to axially move along the guide-way, the movement seat including a driven member locking portion protruded outward from the channel of the housing, for mounting a driven member;

a dustproof belt, passing through an underside of the movement seat, the dustproof belt located under and near an opening of the channel except the part passing through the movement seat, the dustproof belt having two ends fixed on two side ends of the housing, so that when the movement seat is moved, the two ends of the dustproof belt is fixed and is not moved with the movement seat, and the dustproof belt may cover the opening of the channel, thereby producing a dustproof effect;

a drive member, for driving the movement seat to axially move along the guide-way; and a roller set, for guiding the dustproof belt to pass through the movement seat.

2. The linear stage with a seal band in accordance with claim 1, wherein the dustproof belt is made of high-molecular material.

3. The linear stage with a seal band in accordance with claim 1, wherein the roller set includes two first rollers, and two second rollers mounted between the two first rollers and located at a position lower than that of the two first rollers.

4. The linear stage with a seal band in accordance with claim 1, wherein the roller set includes two first rollers, and a second roller mounted between the two first rollers and located at a position lower than that of the two first rollers.

* * * * *